United States Patent [19]
Fujimoto

[11] Patent Number: 4,839,817
[45] Date of Patent: Jun. 13, 1989

[54] NUMERICALLY CONTROLLED APPARATUS INCLUDING SHUNTING CONTROLLER

[75] Inventor: Akihiko Fujimoto, Nagoya, Japan

[73] Assignee: Mitsubishi Denki Kabushiki Kaisha, Tokyo, Japan

[21] Appl. No.: 70,494

[22] Filed: Jul. 7, 1987

[30] Foreign Application Priority Data

Jul. 9, 1986 [JP] Japan .................................. 61-159557

[51] Int. Cl.⁴ ............................................. G05B 19/18
[52] U.S. Cl. ................................................. 364/474.32
[58] Field of Search ............................... 364/167–171, 364/474, 475; 318/570–572

[56] References Cited

U.S. PATENT DOCUMENTS 4,442,493  4/1984  Wakai et al. ......................... 384/475
4,575,791  3/1986  Schwefel ............................. 364/171
4,597,040  6/1986  Buizer ................................. 364/474

Primary Examiner—Allen MacDonald
Attorney, Agent, or Firm—Armstrong, Nikaido, Marmelstein, Kubovcik & Murray

[57] ABSTRACT

A numerically controlled apparatus for working a work piece by a tool, includes a memory unit, a central controller, a calculating unit and a driver for driving the tool. The memory unit stores working programs, execution block numbers, working data and shunting data. The calculating unit calculates the working data and shunting data under the control of the working programs. When the working operation is interrupted, the tool is shunted to a shunting position while performing the working operations in the shunting direction opposite to the normal working direction. Thereafter, the tool is returned to the position where the working operation was interrupted, and thus, the working operations are continued.

2 Claims, 4 Drawing Sheets

NUMERICALLY CONTROLLED APPARATUS INCLUDING SHUNTING CONTROLLER

BACKGROUND OF THE INVENTION

1. Field of the Invention

The present invention relates to a numerically controlled apparatus capable of automatically and rapidly executing and interrupting working programs, and furthermore restarting these working programs.

2. Description of the Related Art

Various types of numerically controlled apparatus such as numerically controlled milling machines, and numerically controlled grinders have been widely used as machine tools and described in, for instance, Japanese patent publication Nos. 47-3076 (1972), 48-37320 (1973) and No. 53-13838 (1978).

There is shown a block diagram of a conventional numerically controlled apparatus in FIG. 1. A control unit 1 includes a central processing unit (referred to as "CPU"). A memory unit 2 and a calculating unit 3, and a drive controlling unit 4 are connected to the control unit 1. The control unit 1 receives an automatic starting signal 11 transferred from an external controller (not shown). A numerically controlled motor 5 is connected to the drive controlling unit 4.

In response to the automatic starting signal 11, various command data of working programs stored in the memory unit 2 are transferred to the control unit 1. Then, the control unit 1 sends transfer command data to the drive control unit 4 in conjunction with operations of the calculating unit 3. The motor 5 is driven by the drive controlling unit 4 to process a work piece (not shown). When this working operation is interrupted due to various reasons, the tools (not shown) are manually removed to a predetermined shunting position. After solving the causes of the working interruption, these tools are manually returned to the working position where the previous working operation was interrupted. Thereafter, the working programs are manually rearranged to the condition under which the working operation was interrupted. Finally, in response to the automatic starting signal 11, the working operation is again commenced.

Since the conventional numerically controlled apparatus are arranged as illustrated in FIG. 1 and controlled in the above-described manner, the manual operations are necessarily required for shunting the tools from the interruption position to the shunting position, for transferring the tools to the position where the work is again commenced, and for resetting the working program to rearrange the working conditions. A lengthy time period is needed until the working operation is restarted after it was interrupted.

It is therefore an object of the present invention to provide a numerically controlled apparatus for shortening a time period from interruption of the work till re-execution of the work. This is accomplished in such a manner that when the working operation is interrupted, the tools are quickly and precisely shunted from the working position, whereas the tools are rapidly returned to the restarting position when the working operation is again commenced.

SUMMARY OF THE INVENTION

The object and features of the present invention are accomplished by providing a numerically controlled apparatus for working a work piece by a tool comprising:

a memory device for storing at least a working program, and execution block numbers, working data and shunting data while performing working operations for the work piece by the tool under the control of said working program;

a calculating drive for performing numerical calculations based upon the working and shunting data under the control of the working program to produce numerical data;

a drive controlling device for controlling a drive device in response to, the numerical data; and, central, controlling device for controlling the drive device via the drive controlling device to interrupt the working operations for the work piece in response to a shunting start signal and then to shunt the tool to a shunting position in a shunting sequence opposite to a working sequence while checking the execution block numbers.

BRIEF DESCRIPTION OF THE DRAWINGS

The aforementioned aspects and other features of the invention ar explained in the following description, taken in connection with the accompanying drawings in which.

DETAILED DESCRIPTION OF THE PREFERRED EMBODIMENTS

Basic Idea

Figure 2:
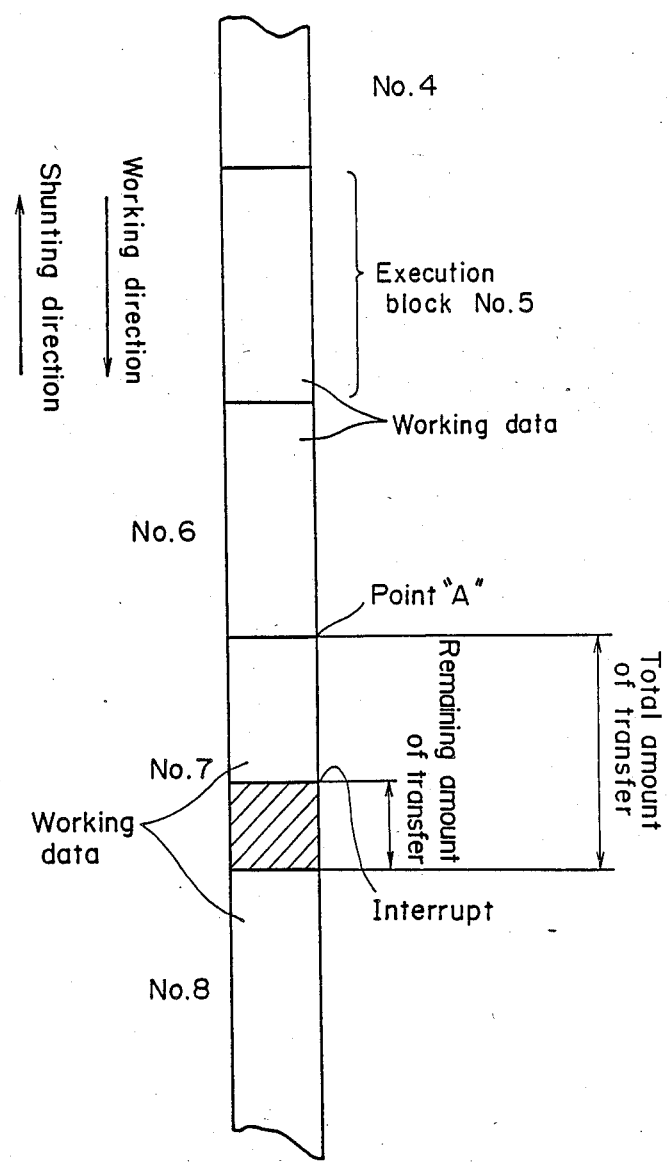
FIG. 2 schematically illustrates a basic idea of the numerical controlling according to the invention.

Before proceeding with various types of preferred embodiments according to the invention, a basic idea of performing the numerical control will now be summarized with reference to FIG. 2.

In FIG. 2, working data are stored in the memory depending upon the respective execution blocks. The numerically controlled apparatus (will be described later), according to the invention, is sequentially controlled under the working data stored in the memory until the interruption command appears in the execution block No. 7. When the interruption command is given to the control unit, the tools are once returned to point "A" along the shunting direction opposite to the working direction.

Upon receipt of the interruption command, the calculator substracts the remaining amount of transfer from the total amount of transfer. It should be noted that both the remaining and total amounts of tool transfer are previously known.

When returning to the point "A", the working data is read out from the memory based upon the execution block No. 6 to which the point "A" belongs. Then, the working data are sequentially read out from the memory, and the control operations are sequentially executed along the shunting direction until the tools are returned to the shunting position.

In response to the restarting signal, the tools are transferred from this shunting position to the position at which the interruption command was given. Thereafter, the working data corresponding to the succeeding execution block, i.e., No. 8 is read out and the succeeding control operation will be executed.

Accordingly, the tools can be quickly and precisely transferred to the shunting position and, moreover, can be instantly, accurately returned to the position where the interruption command was given.

Arrangement of Numerically Controlled Apparatus

Figure 3:
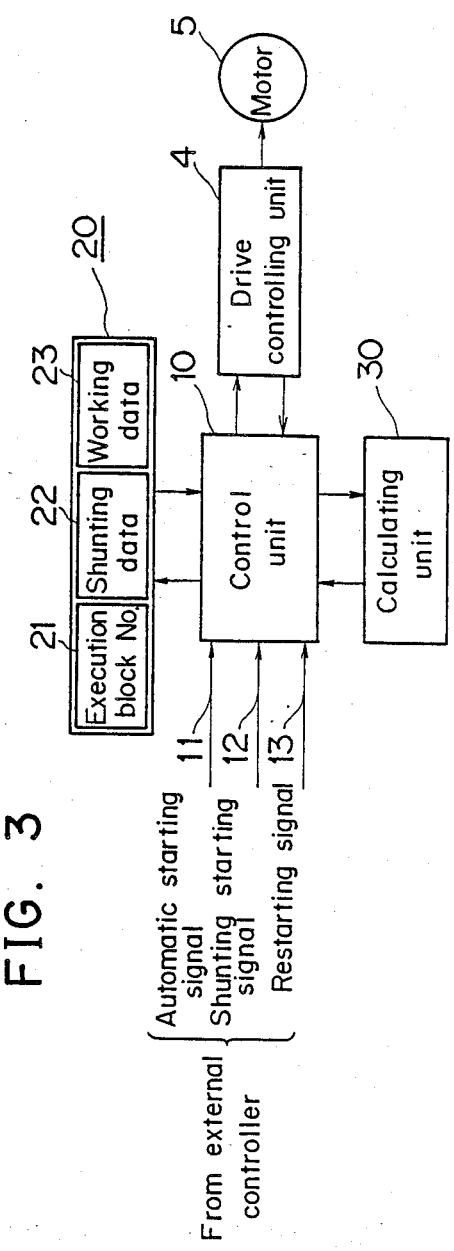
FIG. 3 is a schematic diagram of the numerically controlled apparatus according to a preferred embodiment of the invention.

Referring now to FIG. 3, an arrangement of a numerically controlled apparatus according to the invention will be described.

Figure 1:
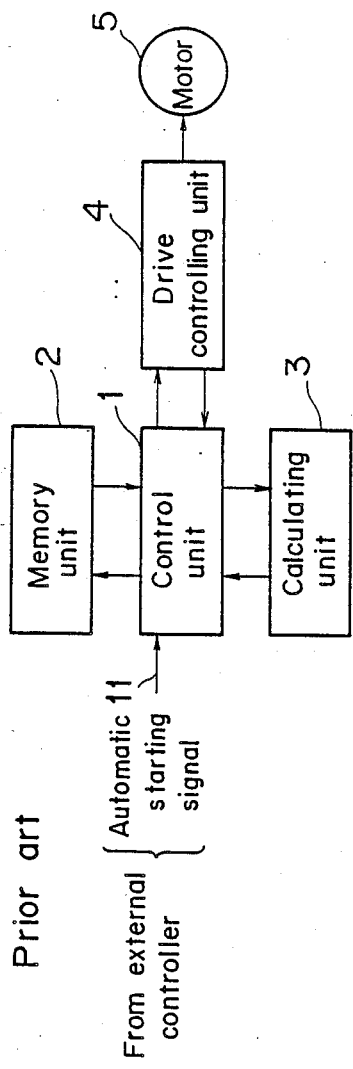
FIG. 1 is a schematic diagram of the conventional numerically controlled apparatus.

It should be noted that the same reference numerals shown in FIG. 1 are employed as those for denoting the same or similar circuit components as shown in FIG. 3.

The numerically controlled apparatus, illustrated in FIG. 3, includes a control unit 10, a calculating unit 30, a memory unit 20, and further, the drive controlling unit 4 and the numerically controlled motor 5. Similarly, the control unit 10 communicates with these units 20, 30, 4 and motor 5. The control unit 10 receives the automatic starting signal 11, a shunting start signal 12, and a restarting signal 13 derived from an external controller (not shown in detail). The memory unit 20 is mainly subdivided into three memory sections 21 to 23. The first memory section 21 stores execution block numbers, the second memory section 22 stores shunting data, and the third memory section 23 stores the working data such as the remaining amount of the tool transfer belonging to the execution block in which the interruption command is given to interrupt the working operation.

Numerical Controlling

Figure 4A:
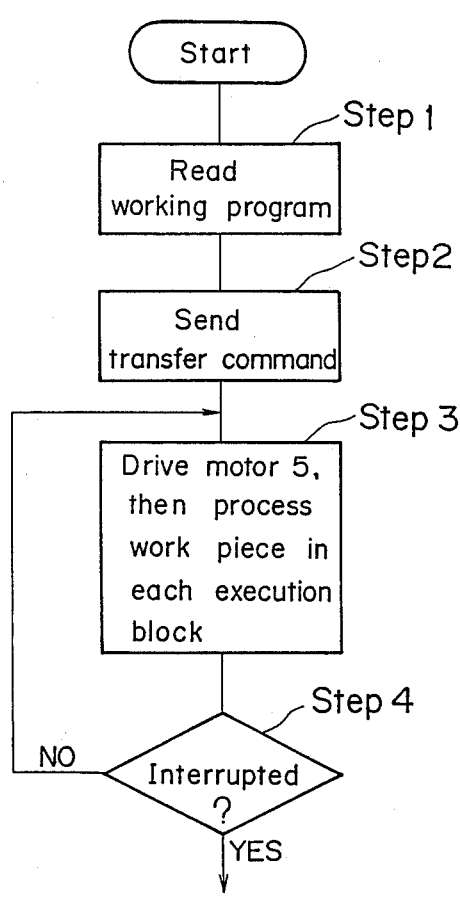
FIGS. 4A to 4C show a flowchart for explaining the typical numerical controlling of the numerically controlled apparatus shown in FIG. 3.
Figure 4B:
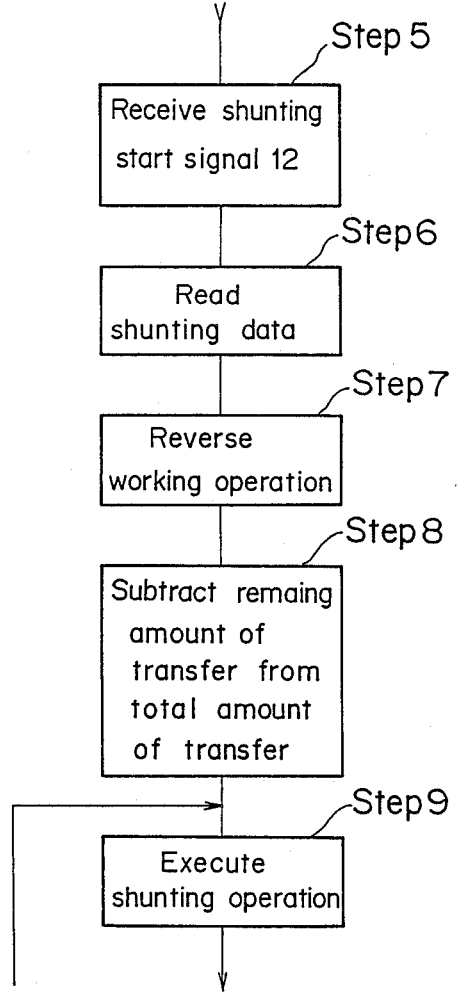
Figure 4C:
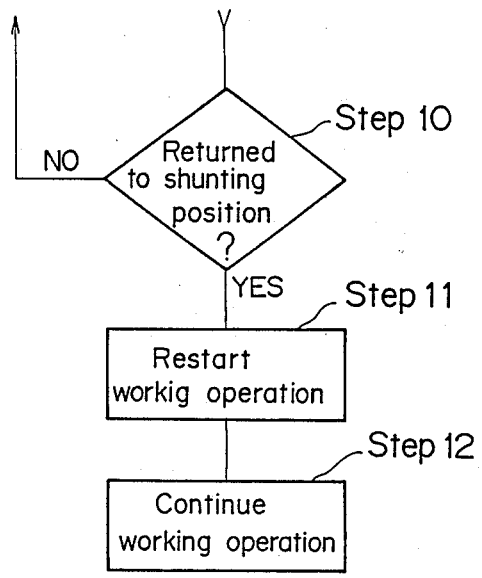

A typical numerical controlling will now be described in detail with reference to a flowchart shown in Figs. 4A to 4C, which is performed in the numerically controlled apparatus illustrated in FIG. 3.

Upon receipt of the automatic starting signal 11 sent from the external controller, the working program is read out from the working data memory section 23 of the memory unit 20 under the control of the control unit 10 in step 1. In response to this working program, the calculating unit 30 performs the predetermined calculation and thereafter, the transfer command is given to the drive controlling unit 4 in step 2. The motor 5 is numerically controlled under the control of the drive control unit 4 so as to process a work piece (not shown) by operating the tools (not shown) in the control sequence of the execution blocks according to the working program in step 3.

If the working operation is interrupted in, for instance, the execution block No. 7 due to various reasons, e.g., malfunction, the shunting start signal 12 is input into the control unit 10 from the external controller in steps 4 and 5. Since the execution block numbers are sequentially stored in the execution block memory section 21, the execution block number indicating that the above-described interruption occurred can be easily recognized. Based upon the interrupted execution block number the shunting data previously stored in the shunting data memory section 23 is read out in step 6. Then, the working operation is reversed along the shunting direction opposite to the working direction in step 7 (see Fig. 2). The calculating unit 30 subtracts the remaining amount of transfer belonging to the interrupted execution block from the above transfer amount given to the drive controlling unit 4 in step 8. This remaining amount of transfer is preciously stored in the working data memory section 23.

The shunting operation is carried out in step 9 as follows. In accordance with the execution block number preceding to the interrupted block number, the corresponding working data is read out from the working data memory section 23, and also the shunting data is read out from the shunting data memory section 22. Accordingly, the working operation is performed in this execution block number along the shunting direction opposite to the normal working direction. The shunting operation is automatically, sequentially continued until the tools are returned to the shunting position in step 10.

After solving the above-described interruption reasons, the working operation is restarted in respense to the restarting signal 13 under the control of the working data stored in the working data memory section 23 based upon the execution block number stored in the memory section 21 in step 11. This working operation is performed in the interrupted execution block No. 7(see FIG. 2). Thereafter, the working operation is continued in the execution blocks succeeding the block No. 7 in step 12.

As has been described in detail, since the memory unit of the numerically controlled apparatus according to the invention previously stores not only the data when the working operation is interrupted, but also the execution block numbers until the interrupted block number in the operation sequence, the working program can be returned from the interrupted execution block toward the starting block in the direction.

Consequently, the particular advantages, according to the invention, exist in that the tools can be quickly, precisely shunted to the shunting position even when the working operation for a work piece having a complex shape is interrupted. After accomplishing the shunting operation, the working operation can be instantly, accurately restarted.

What is claimed is:

1. A numerically controlled apparatus for machining a workpiece with a tool, comprising:
   memory means for storing a control program and a machining program;
   calculating means for performing numerical calculations based at least on the machining program to produce numerical data;
   drive controlling means for controlling drive means for driving said tool in response to said numerical data from said calculating means;
   central controlling means for interpreting said machining program and then outputting corresponding transfer commands to said drive controlling means;
   wherein said memory means includes,
   a first memory section for storing an execution block number which is currently being executed and execution block numbers which have been executed,
   a second memory section for storing machining data of said execution block number which is currently being executed,
   a third memory section for storing shunting data which is used for shunting when the machining of said workpiece is interrupted, and said central controlling means controlling said drive controlling means, comprising means for interrupting in response to a shunting signal, on the basis of the contents of said first memory section, said second memory section, and said third memory section, the execution block currently being executed and for causing the tool to be shunted to a shunting position specified by said shunting data in a sequence in which each one of the instructions of the execution block interrupted and of the execution blocks which have been executed is executed in a reversed sequence of the normal machining sequence.

2. The apparatus of claim 1, wherein said central controlling means includes means for searching said execution block numbers in response to a restarting signal after said tool has been shunted to said shunting position, for transferring said tool from said shunting position to the position where said working operation was interrupted, and for continuing said working operations from said position.

* * * * *